US008464335B1

(12) United States Patent
Sinha et al.

(10) Patent No.: US 8,464,335 B1
(45) Date of Patent: Jun. 11, 2013

(54) DISTRIBUTED, MULTI-TENANT VIRTUAL PRIVATE NETWORK CLOUD SYSTEMS AND METHODS FOR MOBILE SECURITY AND POLICY ENFORCEMENT

(75) Inventors: Amit Sinha, San Jose, CA (US);
Srikanth Devarajan, San Jose, CA (US); Patrick Foxhoven, Santa Clara, CA (US)

(73) Assignee: Zscaler, Inc., San Jose, CA (US)

( * ) Notice: Subject to any disclaimer, the term of this patent is extended or adjusted under 35 U.S.C. 154(b) by 131 days.

(21) Appl. No.: 13/096,727

(22) Filed: Apr. 28, 2011

Related U.S. Application Data

(63) Continuation-in-part of application No. 13/051,519, filed on Mar. 18, 2011.

(51) Int. Cl.
*H04L 29/06* (2006.01)

(52) U.S. Cl.
USPC .............. 726/13; 713/153; 713/154; 713/155

(58) Field of Classification Search
USPC .......................................................... 726/13
See application file for complete search history.

(56) References Cited

U.S. PATENT DOCUMENTS

| | | | | |
|---|---|---|---|---|
| 6,714,515 | B1 * | 3/2004 | Marchand ..................... | 370/231 |
| 7,702,739 | B1 | 4/2010 | Cheng et al. | |
| 2002/0069278 | A1 * | 6/2002 | Forslow ....................... | 709/225 |
| 2002/0132607 | A1 * | 9/2002 | Castell et al. ................ | 455/412 |
| 2004/0083295 | A1 * | 4/2004 | Amara et al. ................ | 709/229 |
| 2004/0236947 | A1 * | 11/2004 | Chaudhuri et al. ........... | 713/169 |
| 2004/0266420 | A1 * | 12/2004 | Malinen et al. .............. | 455/421 |
| 2005/0210148 | A1 * | 9/2005 | Kato et al. ................... | 709/244 |
| 2007/0287417 | A1 * | 12/2007 | Abramovich ................ | 455/410 |
| 2008/0046965 | A1 * | 2/2008 | Wright et al. ................ | 726/1 |
| 2008/0160969 | A1 | 7/2008 | Tromm | |
| 2008/0301801 | A1 * | 12/2008 | Jothimani .................... | 726/15 |
| 2009/0228950 | A1 | 9/2009 | Reed et al. | |

OTHER PUBLICATIONS

Chen et al., A web-based monitor and management system architecture for enterprise virtual private network, Feb. 2005, The 7th International Conference on Advanced Communication Technology, vol. 2, pp. 861-864.*
Michael Sutton; Information Disclosure Statement to USPTO; Mar. 10, 2009.

(Continued)

*Primary Examiner* — Taghi Arani
*Assistant Examiner* — Kenneth Chang
(74) *Attorney, Agent, or Firm* — Clements Bernard PLLC; Lawrence A. Baratta, Jr.; Christopher L. Bernard

(57) ABSTRACT

The present disclosure provides distributed, multi-tenant Virtual Private Network (VPN) cloud systems and methods for mobile security and user based policy enforcement. In an exemplary embodiment, plural mobile devices are configured to connect to one or more enforcement or processing nodes over VPN connections. The enforcement or processing nodes are configured to perform content filtering, policy enforcement, and the like on some or all of the traffic from the mobile devices. The present invention is described as multi-tenant as it can connect to plural clients across different companies with different policies in a single distributed system. Advantageously, the present invention allows smartphone and tablet users to protect themselves from mobile malware, without requiring a security applications on the device. It allows administrators to seamlessly enforce policy for a user regardless of the device or network they are connecting to, as well as get granular visibility into the user's network behavior.

12 Claims, 11 Drawing Sheets

OTHER PUBLICATIONS

Scott Thurm and Yukari Iwatani Kane; Your Apps Are Watching You; Global Compliance Symposium; The Wall Street Journal—Technology—Dec. 18, 2010.

Sara Yin; "'Most Sophisticated' Android Trojan Surfaces in China"—Article Date 12:30:10; PC PCMAG.COM.

Katherine Noyes; Techworld—Android Browser Vulnerability Exposes User Data—How to protect your Android smartphone from attacks; PC World—Published: 10:46 GMT, Nov. 25, 10.

* cited by examiner

DISTRIBUTED, MULTI-TENANT VIRTUAL PRIVATE NETWORK CLOUD SYSTEMS AND METHODS FOR MOBILE SECURITY AND POLICY ENFORCEMENT

CROSS-REFERENCE TO RELATED APPLICATION(S)

This application is a continuation-in-part of co-pending U.S. patent application Ser. No. 13/051,519 filed Mar. 18, 2011, and entitled "SYSTEMS AND METHODS FOR MOBILE APPLICATION SECURITY CLASSIFICATION AND ENFORCEMENT," the contents of which are incorporated in full by reference herein.

FIELD OF THE INVENTION

The present invention relates generally to computer security systems and methods. More particularly, the present invention relates to distributed, multi-tenant Virtual Private Network (VPN) cloud systems and methods for mobile security and user based policy enforcement.

BACKGROUND OF THE INVENTION

Enterprises are struggling with the consumerization of Information Technology (IT). With the proliferation of mobile devices like smart phones, personal digital assistants (PDAs), tablets, net books, etc. within the enterprise, IT administrators can no longer ignore these devices as outside their scope of responsibility. Of note, smart phones, tablets, etc. are now as powerful as laptops. Employees can access corporate data and the Internet through wireless networks such as Wi-Fi hotspots or cellular 3G/4G that are not controlled by IT. With many corporate applications being hosted in the cloud, the risk is even higher. Ensuring the security of corporate data is no longer a matter of deploying adequate measures within the organization. It is imperative that security and policy travel with the employee wherever they are and whatever type of device they use. Furthermore, unlike the personal computer (PC) world that is dominated by a few main operating systems, the number of platforms and device form-factors for mobile devices is much higher, as is their churn rate. IT needs a solution that is easy to deploy, supports multiple mobile platforms and provides consistent user policy enforcement across computers and mobile devices.

There are two primary mobile device security challenges that affect IT organizations as the proliferation and adoption of mobile devices increases with enterprises. The first challenge is that the line between enterprise and personal usage is blurred on mobile devices. These devices run the gamut of applications, from Facebook, YouTube, Pandora, to enterprise applications like email and sales force automation. Since the enterprise typically does not own the device, enforcing policies for acceptable usage or installing application controls like a traditional IT administrator would on a corporate computer is often not viable. There is an increased risk of exposing corporate data on mobile devices since they roam and connect to multiple Wi-Fi and cellular 3G/4G networks. Traditionally, web security protections have been enforced either by way of a gateway web proxy at an enterprise's egress to the Internet or via signature-based anti-virus protections installed on the user's computer. With mobile devices, there is no obvious point of enforcement like an enterprise proxy. To complicate matters further, enterprise data is rapidly migrating to the cloud. As a result, an employee's mobile web transactions may never hit the enterprise network while accessing critical cloud-hosted data.

The second challenge is that security applications for mobile devices are expensive to develop and often ineffective. Unlike the computer world, which is dominated by Microsoft, there are several different mobile operating systems such as Apple's iOS, Google's Android, Windows Mobile, Blackberry, Symbian, etc. Each platform has its own software development environment and a security vendor developing mobile security applications will have to replicate the effort across various platforms. Further, some platforms such as Apple's iOS do not allow traditional anti-virus applications on their platform. Loading third party applications, not approved by the platform vendor, may lead to violation of contract and often requires "jailbreaking" the device—definitely not an enterprise option. Even if security applications are allowed, they are a headache to deploy, require constant updates, and are easy to circumvent, e.g. the user can simply uninstall them if they dislike it. Worst of all, they impact device performance and degrade user experience by stretching the already limited processor and memory resources on the mobile device.

Further, a significant challenge for mobile device security is that, by definition, these devices roam and connect to multiple different wireless networks. For example, a tablet like may connect to a cellular network and multiple Wi-Fi networks (e.g., home, hotel, branch office, service provider hotspot, etc.). In the fixed device scenario, the use connected from a known location (e.g. an office) with a fixed device (e.g., a computer). By inspecting traffic from that known location, malware could be filtered out and user based policy could be enforced. This is not the case with mobile devices. Another challenge with mobile users is that it is hard to enforce a common policy per user, as they connect with multiple devices, on different networks form a variety of locations. So if the company policy was to not allow questionable Internet content on company equipment, how can the administrator make sure that the policy is be enforced for a given user regardless of whether a user is on a computer, a smart phone, or tablet?

BRIEF SUMMARY OF THE INVENTION

In an exemplary embodiment, a network includes plural mobile devices communicatively coupled to one or more networks; and a node communicatively coupled to each of the plural client devices via the one or more networks, wherein the node is configured to perform security analysis and policy enforcement on traffic associated with the plural mobile devices. In another exemplary embodiment, a node includes a network interface communicatively coupled to a network; a data store; a processor communicatively coupled to the network interface and the data store; wherein the node is configured to: establish virtual private network tunnels between plural mobile devices; inspect data from the plural mobile devices to the Internet; and filter data from the Internet to the plural mobile devices. In yet another exemplary embodiment, a method includes obtaining a mobile device; provisioning the mobile device to communicate on a network via a virtual private network tunnel to an enforcement node; sending a data request to an external network via the mobile device, wherein the data request is sent via the virtual private network tunnel to the enforcement node; and at the enforcement node, enforcing policy on the data request and forwarding the data request to the external network.

BRIEF DESCRIPTION OF THE DRAWINGS

The present invention is illustrated and described herein with reference to the various drawings, in which like reference numbers denote like method steps and/or system components, respectively, and in which:

FIG. 7 is a network diagram of the enforcement node connected to a central authority for user authentication, policy updates, network information, and the like;

DETAILED DESCRIPTION OF THE INVENTION

In various exemplary embodiments, the present invention provides distributed, multi-tenant Virtual Private Network (VPN) cloud systems and methods for mobile security and user based policy enforcement. In an exemplary embodiment, plural mobile devices are configured to connect to one or more enforcement or processing nodes over VPN connections. The enforcement or processing nodes are configured to perform content filtering, policy enforcement, and the like on some or all of the traffic from the mobile devices. The present invention is described as multi-tenant as it can connect to plural clients across different companies with different policies in a single distributed system. Advantageously, the present invention allows smartphone and tablet users to protect themselves from mobile malware, without requiring a security applications on the device. It allows administrators to seamless enforce policy for a user regardless of the device or network they are connecting to, as well as get granular visibility into the user's network behavior. Traffic from various mobile user devices are securely brought to various distributed enforcement nodes using a multi-tenant VPN.

Specifically, the present invention enforces policy in the cloud, not on the device. This means all network content is scanned, both browser and application generated web traffic, to ensure that malicious content is blocked in the cloud—long before it reaches the mobile device, or the corporate network. Some of the benefits of the approach include: unlike other mobile security solutions that require platform-specific applications to be installed on every device, the present invention works seamlessly across mobile platforms; the present invention requires no signature updates on the user's device and provides real-time inspection in the cloud for every web transaction, regardless of whether it came from a browser or from an application installed on the device; the present invention runs in the cloud and has no impact on device performance, battery life, or processing resources; the present invention provides real-time logs and reports for any user, from any location, on any device, at any time; and the like.

Figure 1:
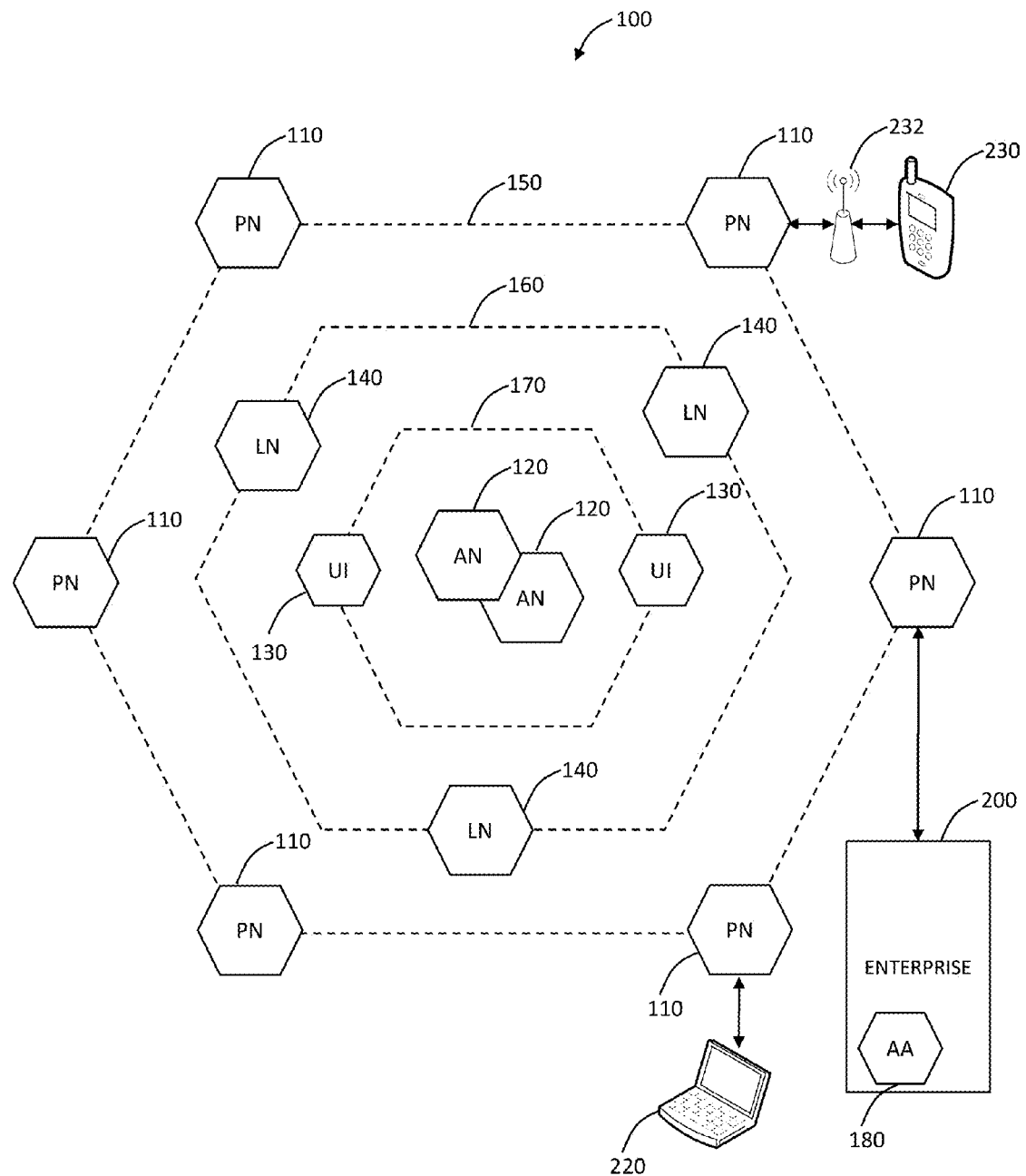
FIG. 1 is a block diagram of a distributed security system which may be utilized for mobile device security and policy enforcement of the present invention.

Referring to FIG. 1, in an exemplary embodiment, a block diagram illustrates a distributed security system 100. The system 100 may, for example, be implemented as an overlay network in a wide area network (WAN), such as the Internet, a local area network (LAN), or the like. The system 100 includes content processing nodes, PN 110, that proactively detect and preclude the distribution of security threats, e.g., malware, spyware, viruses, email spam, etc., and other undesirable content sent from or requested by an external system. Example external systems may include an enterprise 200, a computer device 220, and a mobile device 230, or other network and computing systems communicatively coupled to the system 100. In an exemplary embodiment, each of the processing nodes 110 may include a decision system, e.g., data inspection engines that operate on a content item, e.g., a web page, a file, an email message, or some other data or data communication that is sent from or requested by one of the external systems. In an exemplary embodiment, all data destined for or received from the Internet is processed through one of the processing nodes 110. In another exemplary embodiment, specific data specified by each external system, e.g., only email, only executable files, etc., is process through one of the processing node 110.

Each of the processing nodes 110 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an exemplary embodiment, the threat classification may be reduced to a subset of categories e.g., violating, non-violating, neutral, unknown. Based on the subset classification, the processing node 110 may allow distribution of the content item, preclude distribution of the content item, allow distribution of the content item after a cleaning process, or perform threat detection on the content item. In an exemplary embodiment, the actions taken by one of the processing nodes 110 may be determinative on the threat classification of the content item and on a security policy of the external system to which the content item is being sent from or from which the content item is being requested by. A content item is violating if, for any part $C=[c1, c2, \ldots, cm]$ of the content item, at any of the processing nodes 110, any one of the data inspection engines generates an output that results in a classification of "violating."

Figure 3:
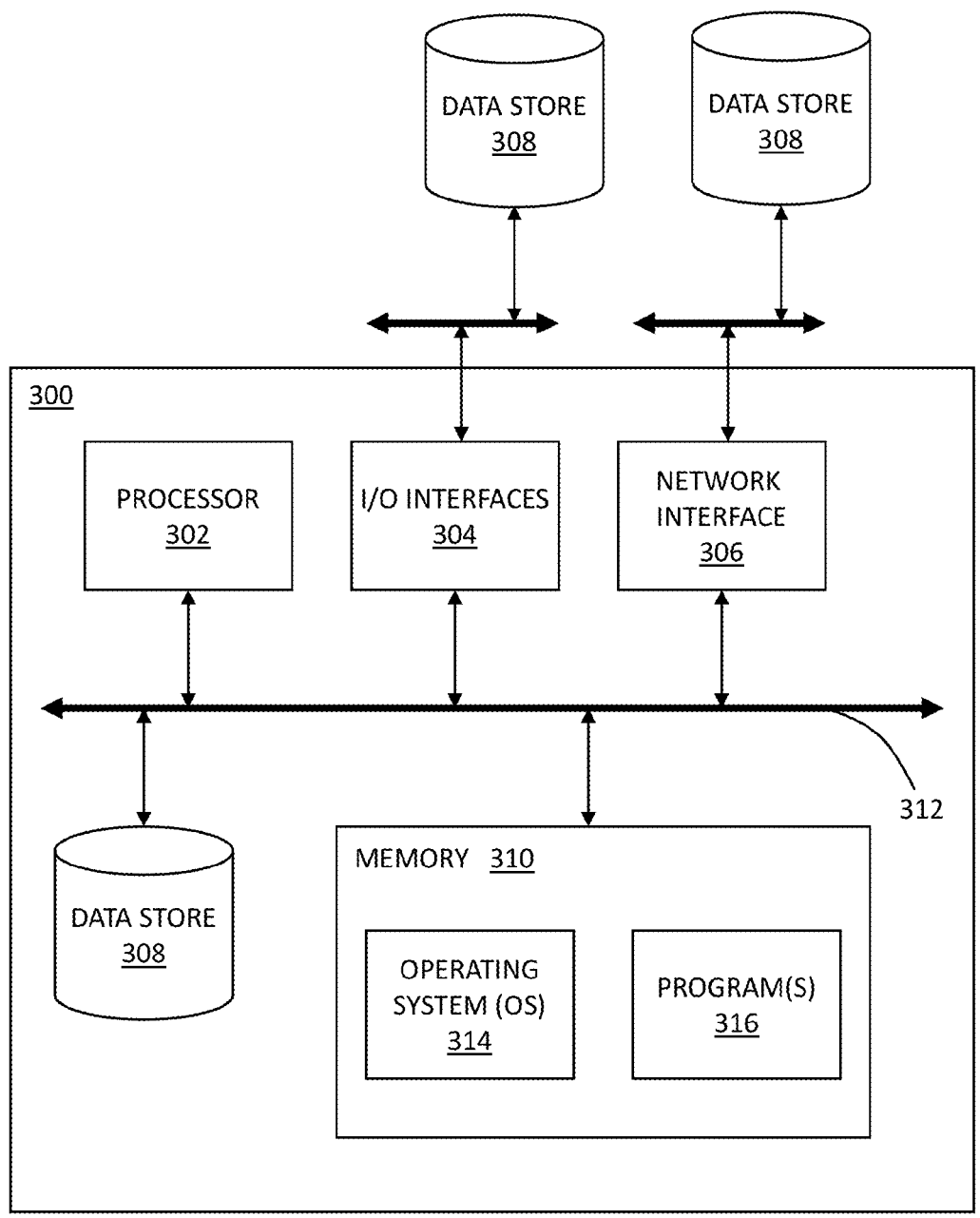
FIG. 3 is a block diagram of a server which may be used in the distributed security system of FIG. 1 or standalone

Each of the processing nodes 110 may be implemented by one or more of computer and communication devices, e.g., server computers, gateways, switches, etc, such as the server 300 described in FIG. 3. In an exemplary embodiment, the processing nodes 110 may serve as an access layer 150. The access layer 150 may, for example, provide external system access to the security system 100. In an exemplary embodiment, each of the processing nodes 110 may include Internet gateways and one or more servers, and the processing nodes 110 may be distributed through a geographic region, e.g., throughout a country, region, campus, etc. According to a service agreement between a provider of the system 100 and an owner of an external system, the system 100 may thus provide security protection to the external system at any location throughout the geographic region.

Data communications may be monitored by the system 100 in a variety of ways, depending on the size and data requirements of the external system. For example, an enterprise 200 may have multiple routers, switches, etc. that are used to communicate over the Internet, and the routers, switches, etc may be configured to establish communications through the nearest (in traffic communication time, for example) processing node 110. A mobile device 230 may be configured to communicated to a nearest processing node 110 through any available wireless access device, such as an access point, or a cellular gateway. A single computer device 220, such as a consumer's personal computer, may have its browser and email program configured to access the nearest processing node 110, which, in turn, serves as a proxy for the computer device 220. Alternatively, an Internet provider may have all of its customer traffic processed through the processing nodes 110.

In an exemplary embodiment, the processing nodes 110 may communicate with one or more authority nodes (AN) 120. The authority nodes 120 may store policy data for each external system and may distribute the policy data to each of the processing nodes 110. The policy may, for example, define security policies for a protected system, e.g., security policies for the enterprise 200. Example policy data may define access privileges for users, web sites and/or content that is disallowed, restricted domains, etc. The authority nodes 120 may distribute the policy data to the access nodes 110. In an exemplary embodiment, the authority nodes 120 may also distribute threat data that includes the classifications of content items according to threat classifications, e.g., a list of known viruses, a list of known malware sites, spam email domains, a list of known phishing sites, etc. The distribution of threat data between the processing nodes 110 and the authority nodes 120 may implemented by push and pull distribution schemes described in more detail below. In an exemplary embodiment, each of the authority nodes 120 may be implemented by one or more computer and communication devices, e.g., server computers, gateways, switches, etc., such as the server 300 described in FIG. 3. In some exemplary embodiments, the authority nodes 120 may serve as an application layer 160. The application layer 160 may, for example, manage and provide policy data, threat data, and data inspection engines and dictionaries for the processing nodes 110.

Other application layer functions may also be provided in the application layer 170, such as a user interface (UI) front-end 130. The user interface front-end 130 may provide a user interface through which users of the external systems may provide and define security policies, e.g., whether email traffic is to be monitored, whether certain web sites are to be precluded, etc. Another application capability that may be provided through the user interface front-end 130 is security analysis and log reporting. The underlying data on which the security analysis and log reporting functions operate are stored in logging nodes (LN) 140, which serve as a data logging layer 160. Each of the logging nodes 140 may store data related to security operations and network traffic processed by the processing nodes 110 for each external system. In an exemplary embodiment, the logging node 140 data may be anonymized so that data identifying an enterprise is removed or obfuscated. For example, identifying data may be removed to provide an overall system summary of security processing for all enterprises and users without revealing the identity of any one account. Alternatively, identifying data may be obfuscated, e.g., provide a random account number each time it is accessed, so that an overall system summary of security processing for all enterprises and users may be broken out by accounts without revealing the identity of any one account. In another exemplary embodiment, the identifying data and/or logging node 140 data may be further encrypted, e.g., so that only the enterprise (or user if a single user account) may have access to the logging node 140 data for its account. Other processes of anonymizing, obfuscating, or securing logging node 140 data may also be used.

In an exemplary embodiment, an access agent 180 may be included in the external systems. For example, the access agent 180 is deployed in the enterprise 200. The access agent 180 may, for example, facilitate security processing by providing a hash index of files on a client device to one of the processing nodes 110, or may facilitate authentication functions with one of the processing nodes 110, e.g., by assigning tokens for passwords and sending only the tokens to a processing node so that transmission of passwords beyond the network edge of the enterprise is minimized. Other functions and processes may also be facilitated by the access agent 180. In an exemplary embodiment, the processing node 110 may act as a forward proxy that receives user requests to external servers addressed directly to the processing node 110. In another exemplary embodiment, the processing node 110 may access user requests that are passed through the processing node 110 in a transparent mode. A protected system, e.g., enterprise 200, may, for example, choose one or both of these modes. For example, a browser may be configured either manually or through the access agent 180 to access the processing node 110 in a forward proxy mode. In the forward proxy mode, all accesses are addressed to the processing node 110.

In an exemplary embodiment, an enterprise gateway may be configured so that user requests are routed through the processing node 110 by establishing a communication tunnel between enterprise gateway and the processing node 110. For establishing the tunnel, existing protocols such as generic routing encapsulation (GRE), layer two tunneling protocol (L2TP), or other Internet Protocol (IP) security protocols may be used. In another exemplary embodiment, the processing nodes 110 may be deployed at Internet service provider (ISP) nodes. The ISP nodes may redirect subject traffic to the processing nodes 110 in a transparent proxy mode. Protected systems, such as the enterprise 200, may use a multiprotocol label switching (MPLS) class of service for indicating the subject traffic that is to be redirected. For example, at the within the enterprise the access agent 180 may be configured to perform MPLS labeling. In another transparent proxy mode exemplary embodiment, a protected system, such as the enterprise 200, may identify the processing node 110 as a next hop router for communication with the external servers.

Figure 2:
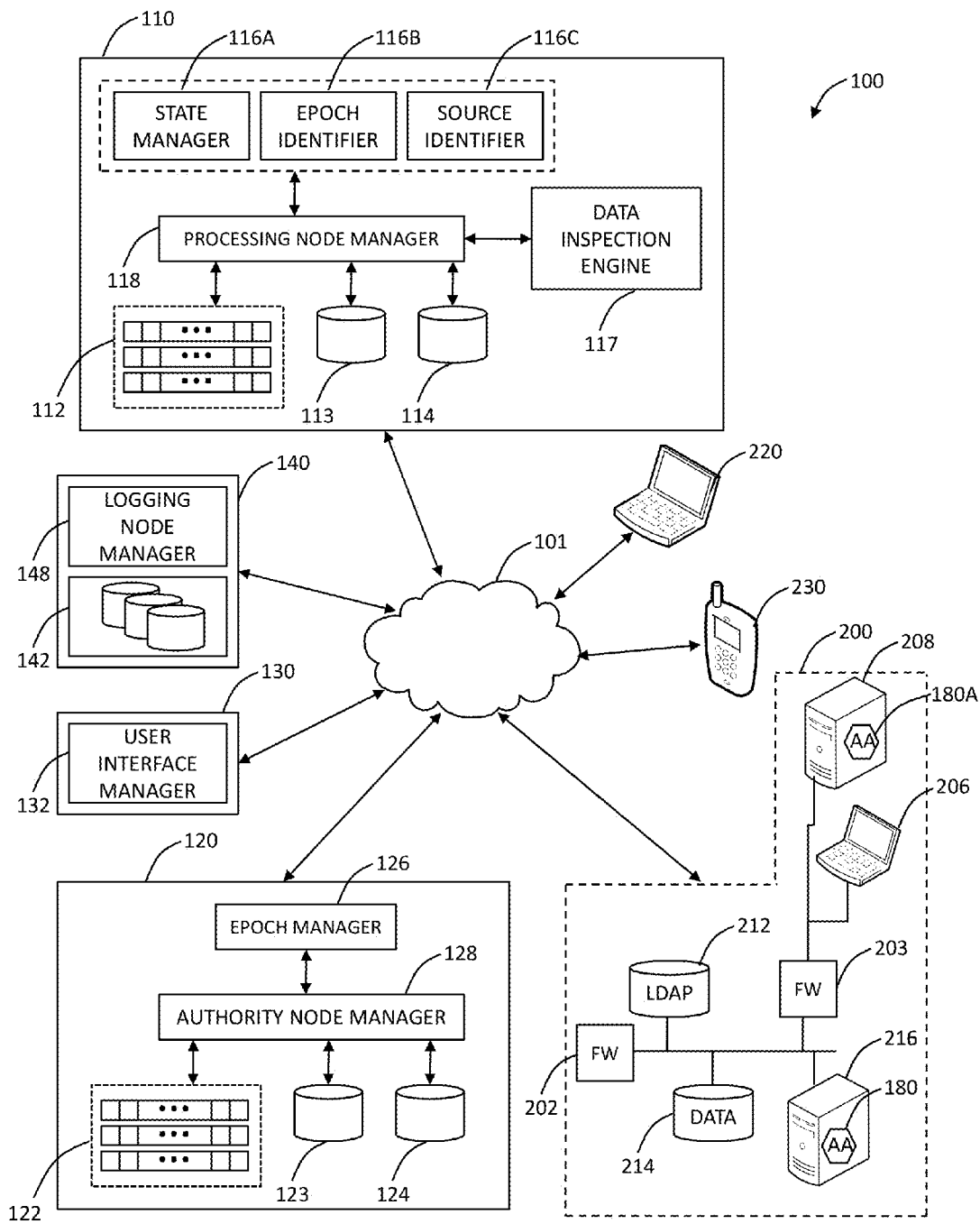
FIG. 2 is a block diagram of the distributed security system of FIG. 1 illustrating various components in more detail.

Referring to FIG. 2, in an exemplary embodiment, a block diagram illustrates various components of the distributed security system 100 in more detail. Although FIG. 2 illustrates only one representative component processing node 110, authority node 120 and logging node 140, those of ordinary skill in the art will appreciate there may be many of each of the component nodes 110, 120 and 140 present in the system 100. A wide area network (WAN) 101, such as the Internet, or some other combination of wired and/or wireless networks, communicatively couples the processing node 110, the authority node 120, and the logging node 140 therebetween. The external systems 200, 220 and 230 likewise communicate over the WAN 101 with each other or other data providers and publishers. Some or all of the data communication of each of the external systems 200, 220 and 230 may be processed through the processing node 110.

FIG. 2 also shows the enterprise 200 in more detail. The enterprise 200 may, for example, include a firewall (FW) 202 protecting an internal network that may include one or more enterprise servers 216, a lightweight directory access protocol (LDAP) server 212, and other data or data stores 214. Another firewall 203 may protect an enterprise subnet that can include user computers 206 and 208 (e.g., laptop and desktop computers). The enterprise 200 may communicate with the WAN 101 through one or more network devices, such as a router, gateway, switch, etc. The LDAP server 212 may store, for example, user login credentials for registered users of the enterprise 200 system. Such credentials may include a user identifiers, login passwords, and a login history associated with each user identifier. The other data stores 214 may include sensitive information, such as bank records, medical records, trade secret information, or any other information warranting protection by one or more security measures.

In an exemplary embodiment, a client access agent 180a may be included on a client computer 208. The client access agent 180a may, for example, facilitate security processing by providing a hash index of files on the user computer 208 to a processing node 110 for malware, virus detection, etc. Other security operations may also be facilitated by the access agent 180a. In another exemplary embodiment, a server access agent 180 may facilitate authentication functions with the processing node 110, e.g., by assigning tokens for passwords and sending only the tokens to the processing node 110 so that transmission of passwords beyond the network edge of the enterprise 200 is minimized. Other functions and processes may also be facilitated by the server access agent 180b. The computer device 220 and the mobile device 230 may also store information warranting security measures, such as personal bank records, medical information, and login information, e.g., login information to the server 206 of the enterprise 200, or to some other secured data provider server. The computer device 220 and the mobile device 230 can also store information warranting security measures, such as personal bank records, medical information, and login information, e.g., login information to a server 216 of the enterprise 200, or to some other secured data provider server.

In an exemplary embodiment, the processing nodes 110 are external to network edges of the external systems 200, 220 and 230. Each of the processing nodes 110 stores security policies 113 received from the authority node 120 and monitors content items requested by or sent from the external systems 200, 220 and 230. In an exemplary embodiment, each of the processing nodes 110 may also store a detection process filter 112 and/or threat data 114 to facilitate the decision of whether a content item should be processed for threat detection. A processing node manager 118 may manage each content item in accordance with the security policy data 113, and the detection process filter 112 and/or threat data 114, if stored at the processing node 110, so that security policies for a plurality of external systems in data communication with the processing node 110 are implemented external to the network edges for each of the external systems 200, 220 and 230. For example, depending on the classification resulting from the monitoring, the content item may be allowed, precluded, or threat detected. In general, content items that are already classified as "clean" or not posing a threat can be allowed, while those classified as "violating" may be precluded. Those content items having an unknown status, e.g., content items that have not been processed by the system 100, may be threat detected to classify the content item according to threat classifications.

The processing node 110 may include a state manager 116A. The state manager 116A may be used to maintain the authentication and the authorization states of users that submit requests to the processing node 110. Maintenance of the states through the state manager 116A may minimize the number of authentication and authorization transactions that are necessary to process a request. The processing node 110 may also include an epoch processor 116B. The epoch processor 116B may be used to analyze authentication data that originated at the authority node 120. The epoch processor 116B may use an epoch ID to further validate the authenticity of authentication data. The processing node 110 may further include a source processor 116C. The source processor 116C may be used to verify the source of authorization and authentication data. The source processor 116C may identify improperly obtained authorization and authentication data, enhancing the security of the network. Collectively, the state manager 116A, the epoch processor 116B, and the source processor 116C operate as data inspection engines.

Because the amount of data being processed by the processing nodes 110 may be substantial, the detection processing filter 112 may be used as the first stage of an information lookup procedure. For example, the detection processing filter 112 may be used as a front end to a looking of the threat data 114. Content items may be mapped to index values of the detection processing filter 112 by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence. Each content item may have an information key that is hashed. For example, the processing node manager 118 may identify the Uniform Resource Locator (URL) address of URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 may improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst case additional cost is only on the order of one, and thus its use for most failure queries saves on the order of m log m, where m is the number of information records present in the threat data 114.

The detection processing filter 112 thus improves performance of queries where the answer to a request for information is usually positive. Such instances may include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information. In an exemplary embodiment, the detection processing filter 112 may be a Bloom filter implemented by a single hash function. The Bloom filter may be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

In general, the authority node 120 includes a data store that stores master security policy data 123 for each of the external systems 200, 220 and 230. An authority node manager 128 may be used to manage the master security policy data 123, e.g., receive input from users of each of the external systems defining different security policies, and may distribute the master security policy data 123 to each of the processing nodes 110. The processing nodes 110 then store a local copy of the security policy data 113. The authority node 120 may also store a master detection process filter 122. The detection processing filter 122 may include data indicating whether content items have been processed by one or more of the data inspection engines 116 in any of the processing nodes 110. The authority node manager 128 may be used to manage the master detection processing filter 122, e.g., receive updates from a processing nodes 110 when the processing node 110 has processed a content item and update the master detection processing filter 122. For example, the master detection processing filter 122 may be distributed to the processing nodes 110, which then store a local copy of the detection processing filter 112.

In an exemplary embodiment, the authority node 120 may include an epoch manager 126. The epoch manager 126 may be used to generate authentication data associated with an epoch ID. The epoch ID of the authentication data is a verifiable attribute of the authentication data that can be used to identify fraudulently created authentication data. In an exemplary embodiment, the detection processing filter 122 may be a guard table. The processing node 110 may, for example, use the information in the local detection processing filter 112 to quickly determine the presence and/or absence of information, e.g., whether a particular URL has been checked for malware; whether a particular executable has been virus scanned, etc. The authority node 120 may also store master threat data 124. The master threat data 124 may classify content items by threat classifications, e.g., a list of known viruses, a list of known malware sites, spam email domains, list of known or detected phishing sites, etc. The authority node manager 128 may be used to manage the master threat data 124, e.g., receive updates from the processing nodes 110 when one of the processing nodes 110 has processed a content item and update the master threat data 124 with any pertinent results. In some implementations, the master threat data 124 may be distributed to the processing nodes 110, which then store a local copy of the threat data 114. In another exemplary embodiment, the authority node 120 may also monitor the health of each of the processing nodes 110, e.g., the resource availability in each of the processing nodes 110, detection of link failures, etc. Based on the observed health of each of the processing nodes 110, the authority node 120 may redirect traffic among the processing nodes 110 and/or balance traffic among the processing nodes 110. Other remedial actions and processes may also be facilitated by the authority node 110.

The processing node 110 and the authority node 120 may be configured according to one or more push and pull processes to manage content items according to security policy data 113 and/or 123, detection process filters 112 and/or 122, and the threat data 114 and/or 124. In a threat data push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data 114, then the processing node manager 118 may cause one or more of the data inspection engines 117 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120.

The authority node manager 128, in response to receiving the threat data update, updates the master threat data 124 stored in the authority node data store according to the threat data update received from the processing node 110. In an exemplary embodiment, the authority node manager 128 may automatically transmit the updated threat data to the other processing nodes 110. Accordingly, threat data for new threats as the new threats are encountered are automatically distributed to each processing node 110. Upon receiving the new threat data from the authority node 120, each of processing node managers 118 may store the updated threat data in the locally stored threat data 114.

In a threat data pull and push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data, then the processing node manager 118 may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data store. If responsive threat data is stored in the master threat data 124, then the authority node manager 128 provide a reply that includes the responsive threat data to the processing node 110 so that the processing node manager 118 may manage the content item in accordance with the security policy data 112 and the classification of the content item. Conversely, if the authority node manager 128 determines that responsive threat data is not stored in the master threat data 124, then the authority node manager 128 may provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests related to responsive threat data for the content item from other processing nodes 110 can be readily served with responsive threat data.

In a detection process filter and threat data push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 may be implemented to ensure that a false positive has not occurred. The initial check of the detection process filter 112, however, may eliminate many null queries to the threat data 114, which, in turn, conserves system resources and increases efficiency. If the content item is classified by the threat data 114, then the processing node manager 118 may manage the content item in accordance with the security policy data 113 and the classification of the content item. Conversely, if the processing node manager 118 determines that the content item is not classified by the threat data 114, or if the processing node manager 118 initially determines through the detection process filter 112 that the content item is not classified by the threat data 114, then the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to one of the authority nodes 120.

The authority node manager 128, in turn, may update the master threat data 124 and the master detection process filter 122 stored in the authority node data store according to the threat data update received from the processing node 110. In an exemplary embodiment, the authority node manager 128 may automatically transmit the updated threat data and detection processing filter to other processing nodes 110. Accordingly, threat data and the detection processing filter for new threats as the new threats are encountered are automatically distributed to each processing node 110, and each processing node 110 may update its local copy of the detection processing filter 112 and threat data 114.

In a detection process filter and threat data pull and push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 can be implemented to ensure that a false positive has not occurred. The initial check of the detection process filter 112, however, may eliminate many null queries to the threat data 114, which, in turn, conserves system resources and increases efficiency. If the processing node manager 118 determines that the content item has not been processed, it may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data 120 store. If responsive threat data is stored in the master threat data 124, then the authority node manager 128 provides a reply that includes the responsive threat data to the processing node 110 so that the processing node manager 118 can manage the content item in accordance with the security policy data 112 and the classification of the content item, and further update the local detection processing filter 112. Conversely, if the authority node manager 128 determines that responsive threat data is not stored in the master threat data 124, then the authority node manager 128 may provide a reply that does not include the responsive threat data to the processing node 110. In response, the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 may then update the master threat data 124. Thereafter, any future requests for related to responsive threat data for the content item from other processing nodes 110 can be readily served with responsive threat data.

The various push and pull data exchange processes provided above are exemplary processes for which the threat data and/or detection process filters may be updated in the system 100 of FIGS. 1 and 2. Other update processes, however, are contemplated with the present invention. The data inspection engines 116, processing node manager 118, authority node manager 128, user interface manager 132, logging node manager 148, and authority agent 180 may be realized by instructions that upon execution cause one or more processing devices to carry out the processes and functions described above. Such instructions can, for example, include interpreted instructions, such as script instructions, e.g., JavaScript or ECMAScript instructions, or executable code, or other instructions stored in a computer readable medium. Other processing architectures can also be used, e.g., a combination of specially designed hardware and software, for example.

Referring to FIG. 3, in an exemplary embodiment, a block diagram illustrates a server 300 which may be used in the system 100 or standalone. Any of the processing nodes 110, the authority nodes 120, and the logging nodes 140 may be formed through one or more servers 300. Further, the computer device 220, the mobile device 230, the servers 208, 216, etc. may include the server 300. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 can include, for example, a serial port, a parallel port, a small computer system interface (SCSI), an infrared (IR) interface, a radio frequency (RF) interface, and/or a universal serial bus (USB) interface.

The network interface 306 may be used to enable the server 300 to communicate on a network, such as the Internet, the WAN 101, the enterprise 200, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The operating system 314 may be any of Windows NT, Windows 2000, Windows XP, Windows Vista, Windows 7, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), Android and variants thereof (available from Google, Inc. of Mountain View, Calif.), or the like. The one or more programs 316 may be configured to implement the various processes, algorithms, methods, techniques, etc. described herein.

Figure 4:
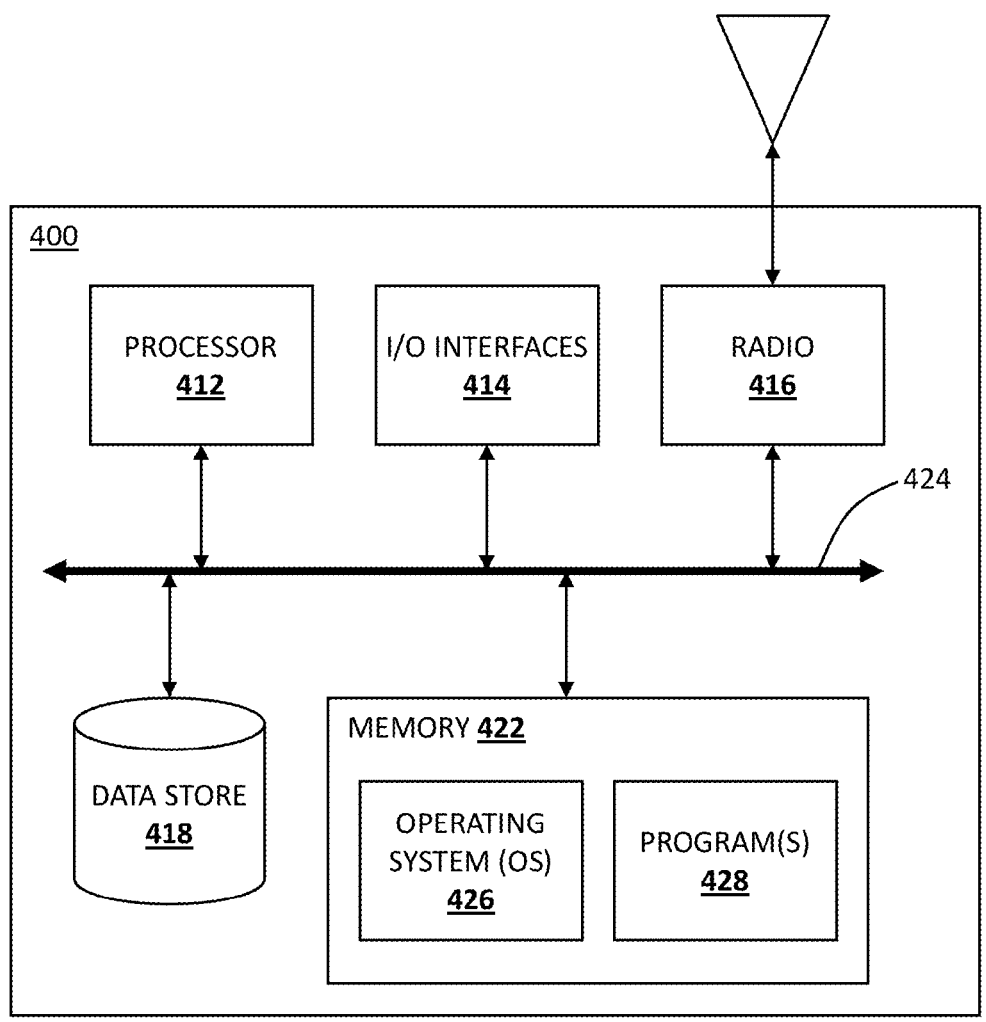
FIG. 4 is a block diagram of a mobile device which may be used in the system of FIG. 1 or with any other cloud-based system.

Referring to FIG. 4, in an exemplary embodiment, a block diagram illustrates a mobile device 400, which may be used in the system 100 or the like. The mobile device 400 can be a digital device that, in terms of hardware architecture, generally includes a processor 412, input/output (I/O) interfaces 414, a radio 416, a data store 418, and memory 422. It should be appreciated by those of ordinary skill in the art that FIG. 4 depicts the mobile device 410 in an oversimplified manner, and a practical embodiment may include additional components and suitably configured processing logic to support known or conventional operating features that are not described in detail herein. The components (412, 414, 416, 418, and 422) are communicatively coupled via a local interface 424. The local interface 424 can be, for example but not limited to, one or more buses or other wired or wireless connections, as is known in the art. The local interface 424 can have additional elements, which are omitted for simplicity, such as controllers, buffers (caches), drivers, repeaters, and receivers, among many others, to enable communications. Further, the local interface 424 may include address, control, and/or data connections to enable appropriate communications among the aforementioned components.

The processor 412 is a hardware device for executing software instructions. The processor 412 can be any custom made or commercially available processor, a central processing unit (CPU), an auxiliary processor among several processors associated with the mobile device 410, a semiconductor-based microprocessor (in the form of a microchip or chip set), or generally any device for executing software instructions. When the mobile device 410 is in operation, the processor 412 is configured to execute software stored within the memory 422, to communicate data to and from the memory 422, and to generally control operations of the mobile device 410 pursuant to the software instructions. In an exemplary embodiment, the processor 412 may include a mobile optimized processor such as optimized for power consumption and mobile applications. The I/O interfaces 414 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 414 can also include, for example, a serial port, a parallel port, a small computer system interface (SCSI), an infrared (IR) interface, a radio frequency (RF) interface, a universal serial bus (USB) interface, and the like. The I/O interfaces 414 can include a graphical user interface (GUI) that enables a user to interact with the mobile device 410. Additionally, the I/O interfaces 414 may further include an imaging device, i.e. camera, video camera, etc.

The radio 416 enables wireless communication to an external access device or network. Any number of suitable wireless data communication protocols, techniques, or methodologies can be supported by the radio 416, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols; wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 418 may be used to store data. The data store 418 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 418 may incorporate electronic, magnetic, optical, and/or other types of storage media.

The memory 422 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 422 may incorporate electronic, magnetic, optical, and/or other types of storage media. Note that the memory 422 may have a distributed architecture, where various components are situated remotely from one another, but can be accessed by the processor 412. The software in memory 422 can include one or more software programs, each of which includes an ordered listing of executable instructions for implementing logical functions. In the example of FIG. 4, the software in the memory system 422 includes a suitable operating system (O/S) 426 and programs 428. The operating system 426 essentially controls the execution of other computer programs, and provides scheduling, input-output control, file and data management, memory management, and communication control and related services. The operating system 426 may be any of LINUX (or another UNIX variant), Android (available from Google), Symbian OS, Microsoft Windows CE, Microsoft Windows 7 Mobile, iOS (available from Apple, Inc.), webOS, Blackberry OS, and the like. The programs 428 may include various applications, add-ons, etc. configured to provide end user functionality with the mobile device 400. For example, exemplary programs 428 may include, but not limited to, a web browser, social networking applications, streaming media applications, games, mapping and GPS applications, electronic mail applications, financial applications, and the like. In a typical example, the end user typically uses one or more of the programs 428 along with a network such as the system 100.

Figure 5:
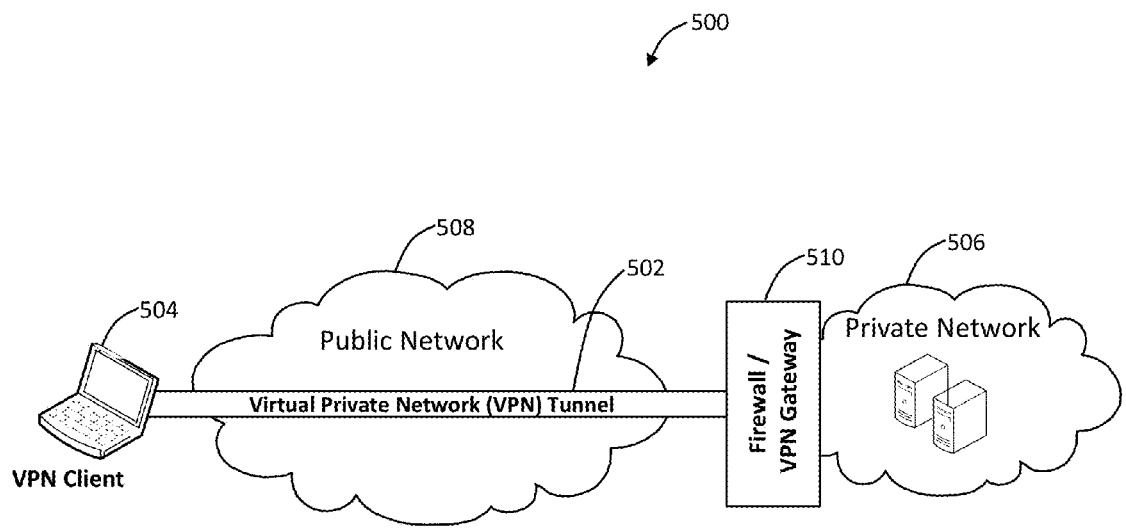
FIG. 5 is a network diagram of a virtual private network (VPN) connection (also referred to as a VPN tunnel) between a client and a private network.

Referring to FIG. 5, in an exemplary embodiment, a network 500 illustrates a virtual private network (VPN) connection 502 (also referred to as a VPN tunnel) between a client 504 and a private network 506. A VPN is a computer network that uses a public telecommunication infrastructure such as the Internet, a public network 508, or the like to provide remote offices or individual users with secure access to their organization's network. VPNs aim to avoid an expensive system of owned or leased lines that can be used by only one organization. The VPN connection 502 encapsulates data transfers using a secure cryptographic method between the client 504 and a firewall/VPN gateway 510 which is communicatively coupled to the private network 506 keeping transferred data private from other devices on one or more intervening local or wide area networks. The client 504 may include the mobile device 400 with software disposed thereon for configuring and operating the VPN connection 502. The firewall/VPN gateway 510 may include the server 300 also with software disposed thereon for configuring and operating the VPN connection 502. Exemplary secure VPNs may include Internet Protocol Security (IPsec), Transport Layer Security (SSL/TLS), Datagram Transport Layer Security (DTLS) available from Cisco Systems, Microsoft Point-to-Point Encryption (MPPE) available from Microsoft Corporation, and the like. In an exemplary embodiment, the present invention may utilize multiple concurrent VPN tunnels to bring traffic from different users across different organizations to various enforcement nodes distributed globally.

Figure 6:
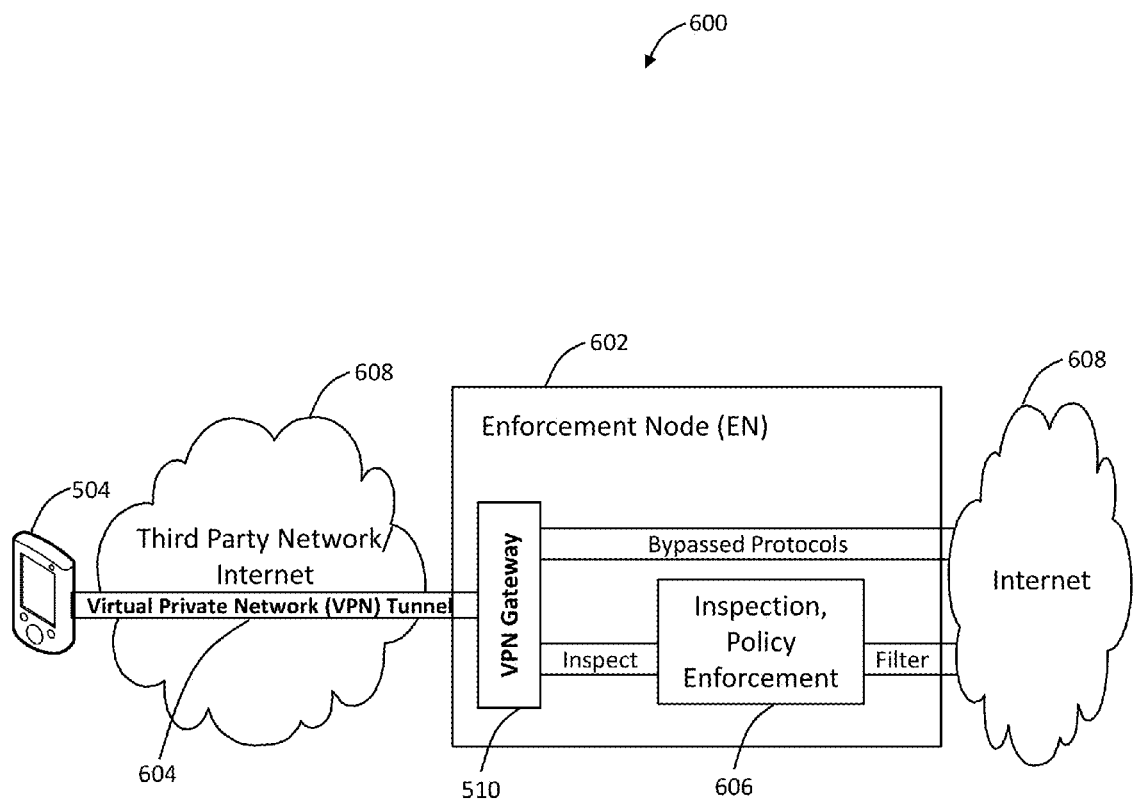
FIG. 6 is a network diagram of a client connected to an enforcement node via a VPN tunnel.

Referring to FIG. 6, in an exemplary embodiment, a network 600 illustrates the client 504 connected to an enforcement node 602 via a VPN tunnel 604. In an exemplary embodiment, the present invention may include the enforcement node 602 which is the VPN gateway 510 and provides data inspection, policy enforcement, malware detection, and the like through an inspection block 606. The enforcement node 602 serves as a gateway to a third party network/Internet 608. Further, in an exemplary embodiment, the enforcement node 602 may include one of the processing nodes 110 in the system 100. In operation, the enforcement node 602 is configured to terminate VPN tunnels from different mobile devices 504, such as through the third party network/Internet 608. Since the VPN brings all traffic to the enforcement node 602, not just HTTP(s)-based web traffic, the enforcement node 602 may be configured to separate out the protocols for further processing with the inspection block 606 (e.g., web, email) from others that are bypassed. Once processed or bypassed from the enforcement node 602, data may be communicated to the Internet 608.

Figure 7:
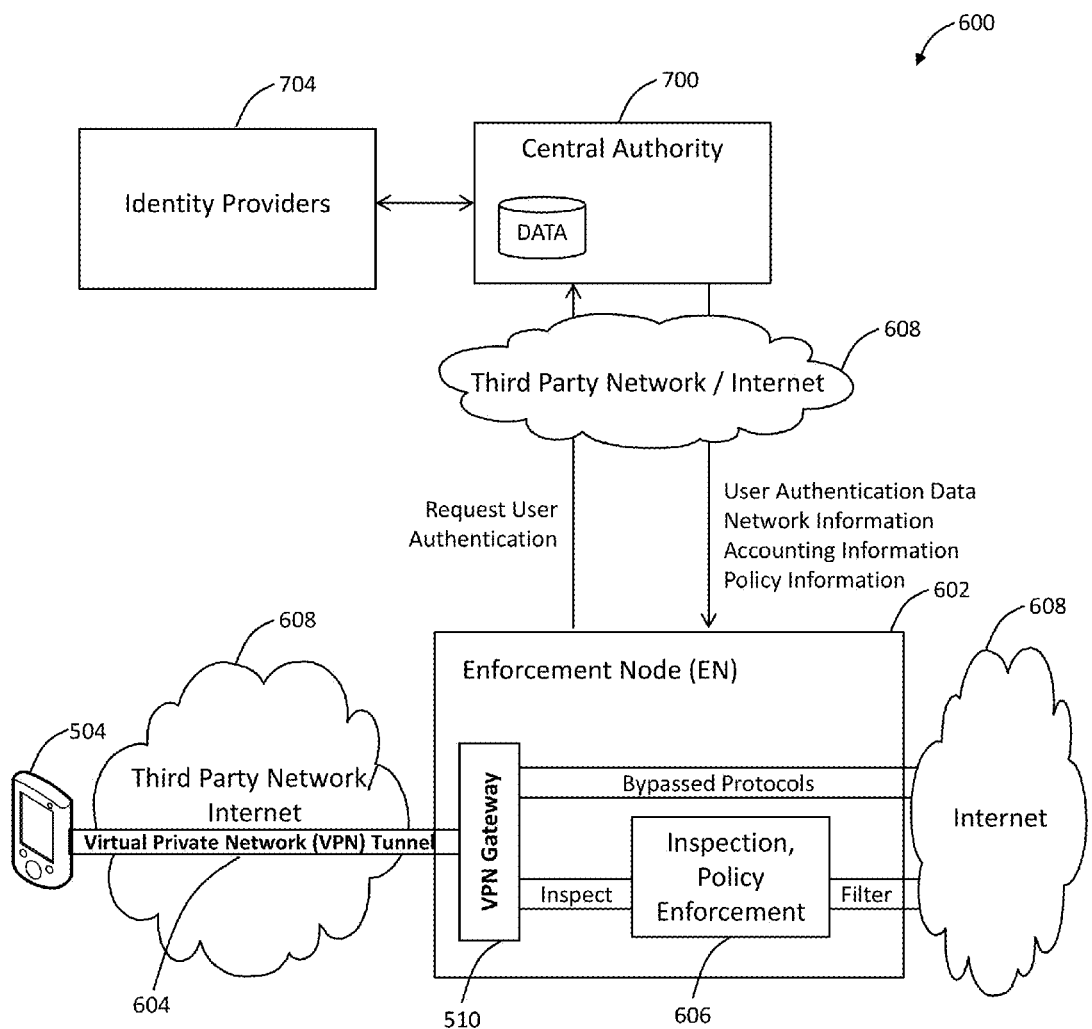

Referring to FIG. 7, in an exemplary embodiment, the enforcement node 602 is illustrated connected to a central authority 700 for user authentication, policy updates, network information, and the like. When the client 504, such as a mobile device, connects using the VPN connection 604 to the enforcement node 602, the enforcement node 602 has to authenticate the user and obtain policy and network information. In an exemplary embodiment, the enforcement node 602 may be communicatively coupled to the central authority 700, such as, for example, over the Internet 608. The central authority 700 may include one or more of the servers 300, and can host user credentials. In an exemplary embodiment, the central authority 700 may include the authority node (AN) 120 in the system 100 of FIG. 1. Alternatively the central authority 700 can access other directory servers (e.g. Lightweight Directory Access Protocol (LDAP), Active Directory, etc.), authentication, authorization and accounting (AAA) servers or a third party identification (ID) provider 702 over protocols such as Security Assertion Markup Language (SAML). The central authority 700 also provides policy information (e.g., what sites the user is allowed to access, etc.) along with network information. Network information includes attributes such as company specific IP address ranges would be reserved in the multi-tenant VPN. Based on the company the user is associated with, the VPN server may allocate an IP address for the tunnel to the mobile VPN client. Once the user is authenticated and connected, the enforcement node 602 tracks user activity based on the tunnel's IP address which is unique for the user. Accounting messages between the central authority 700 and enforcement node 602 make sure that at any given time; only one user is mapped to an internal VPN IP across the global cloud.

Figure 8:
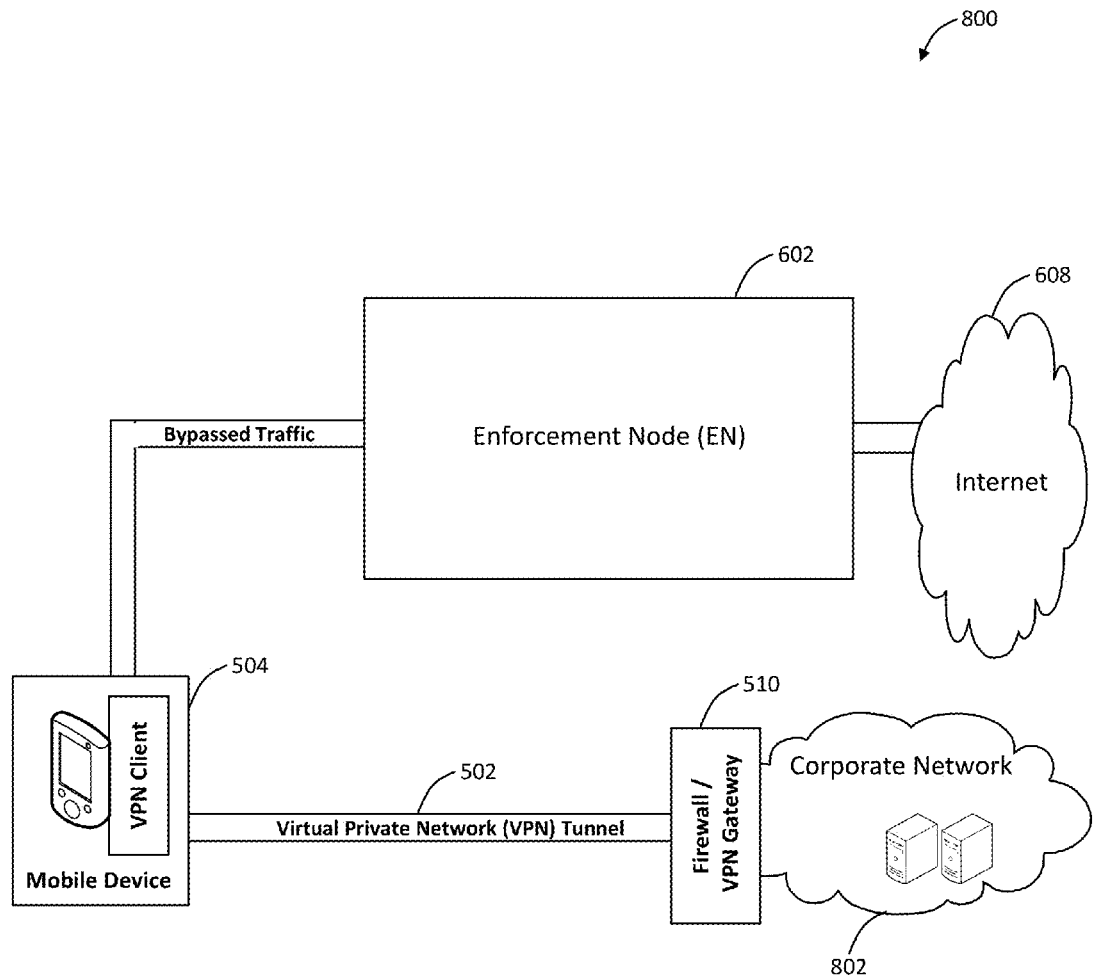
FIG. 8 is a network diagram of a split-tunnel configuration between the client, a firewall/VPN gateway, and an enforcement node.

Referring to FIG. 8, in an exemplary embodiment, a split-tunnel configuration 800 is illustrated between the client 504, a firewall/VPN gateway 510, and an enforcement node 602. In the exemplary embodiments of FIGS. 6 and 7, the VPN connection 604 was configured such that all traffic to/from the client 504 was over the VPN connection 604 to/from the enforcement node 602. In the exemplary embodiment of FIG. 8, the firewall/VPN gateway 510 is hosted "on-premise" by an organization, i.e. a corporate network 802. A VPN connection 502 between the client 502 and the firewall/VPN gateway 510 can be configured such that only traffic destined for the organization's corporate network 802 goes over the VPN connection 502. This may be based on VPN client software configured on the client 504. Other traffic such as outbound traffic (e.g. web traffic) is routed to the enforcement nodes 602 directly. This can be enabled by using a web proxy on the VPN client. The end result is that web traffic is forwarded to the enforcement nodes 602 directly and corporate traffic is sent over the VPN tunnel 502 to the corporate network 802, i.e. the VPN service need not be hosted in the cloud.

Figure 9:
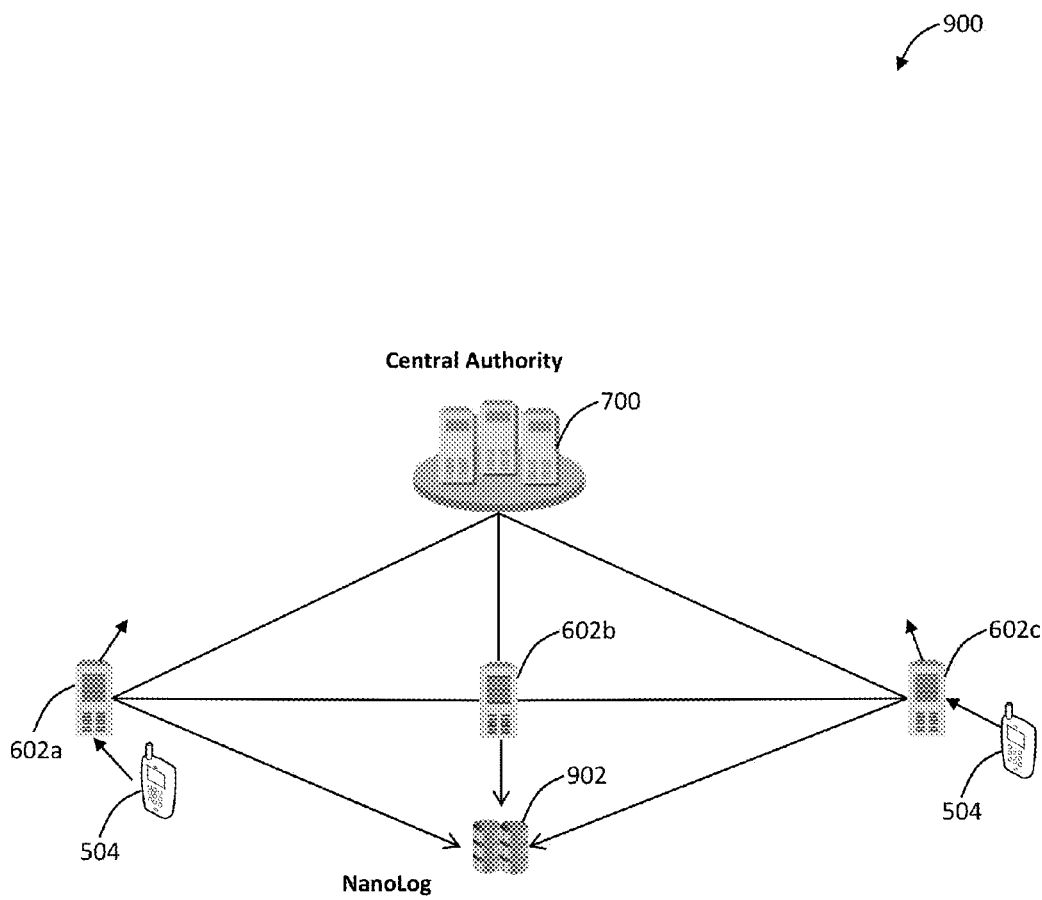
FIG. 9 is a network diagram of a distributed, multi-tenant VPN cloud of plural enforcement nodes and a central authority.

Referring to FIG. 9, in an exemplary embodiment, a network 900 illustrates a distributed, multi-tenant VPN cloud of plural enforcement nodes 602a, 602b, 602c and a central authority 700. For example, multiple enforcement nodes 602 may be deployed across a geographically diverse area, such as, for example, deployed across strategic data centers around the globe. In an exemplary embodiment, based on the location of the client 504, a VPN tunnel is automatically established to the nearest enforcement node 602a, 602b, 602c. This minimizes re-routing latency by eliminating unnecessary backhaul. A mobile client 504 may be configured to connect to an address, for example, vpn.zscaler.net. A Domain Name System (DNS) may automatically resolve vpn.zscaler.net to the IP address of the nearest enforcement node 602a, 602b, 602c based on the location of where the DNS request came from. Alternatively, location aware VPN clients may use GPS or other location determination methods to automatically detect the co-ordinates of the mobile client 504 and choose the nearest enforcement node 602a, 602b, 602c to connect to. All of the enforcement nodes 602a, 602b, 602c are communicatively coupled to the central authority 700. The central authority 700 may be deployed in a redundant cluster for fault tolerance, i.e. plural servers 300. User logs from the various enforcement nodes 602a, 602b, 602c may be centrally stored in a NanoLog 902. The NanoLog 902 may include plural databases, and like the central authority 700 may include the servers 300 deployed in a redundant configuration.

The central authority 700 includes one or more of the servers 300 and is configured to act as a central point in a cloud-based, distributed, multi-tenant VPN system such as the network 900. The central authority 700 is communicatively coupled to each of the enforcement nodes 602a, 602b, 602c and the NanoLog 902. The central authority includes software enabling configuration, provisioning, and monitoring of the distributed, multi-tenant VPN system. These activities may include policy definitions, updates, statistics regarding the distributed, multi-tenant VPN system, alarms and warnings, and the like. The enforcement nodes 602a, 602b, 602c are configured as network on-ramps for the clients 504. The enforcement nodes 602a, 602b, 602c may derive their traffic processing functionality, policy enforcement, etc. from the central authority 700. The enforcement nodes 602a, 602b, 602c may further gather statistics related to operation and provide such statistics to the NanoLog 902. In an exemplary embodiment, the client 504 is configured to access a nearest enforcement node 602a, 602b, 602c as described herein.

Figure 10:
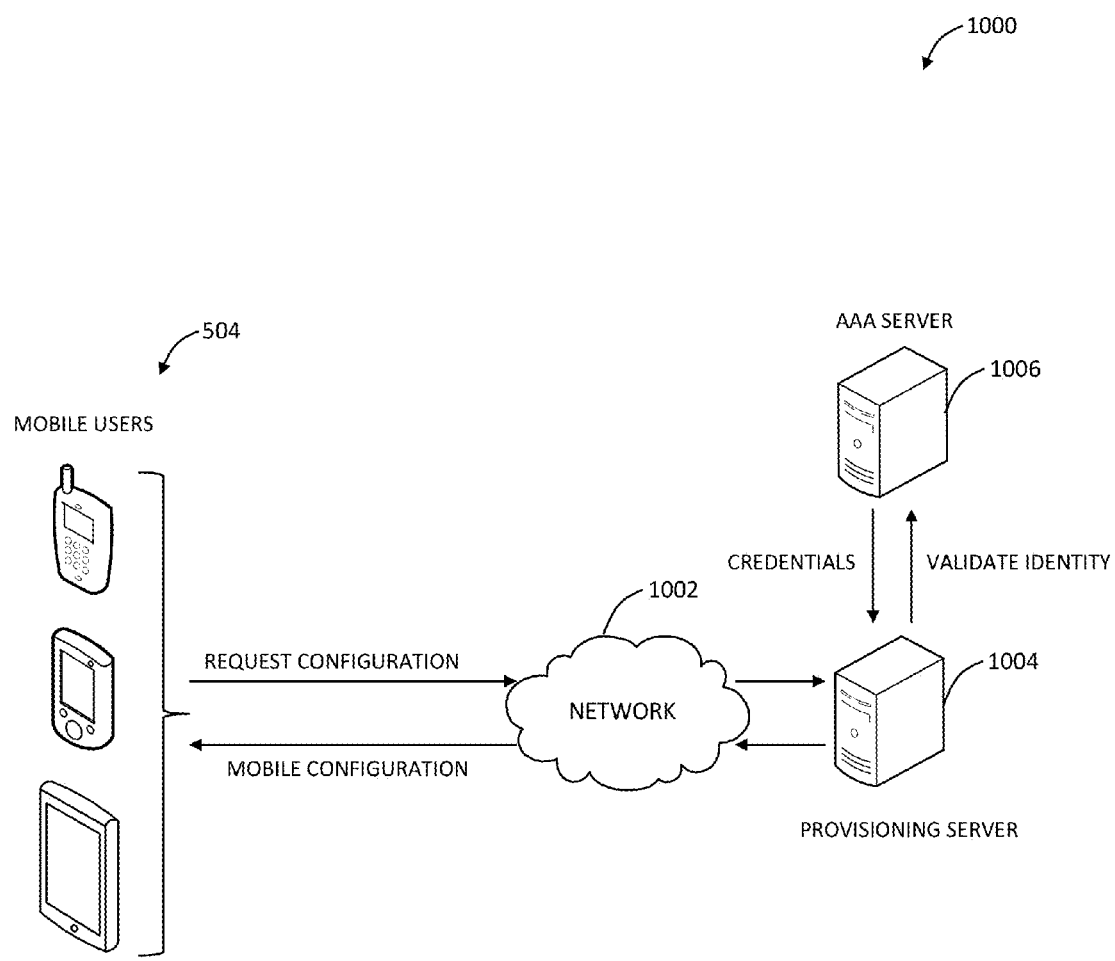
FIG. 10 is a network diagram of a mobile configuration process for provisioning the client for communication in a distributed, multi-tenant VPN system.

Referring to FIG. 10, in an exemplary embodiment, a mobile configuration process is illustrated for provisioning the client 504 for communication in a distributed, multi-tenant VPN system 1000. In particular, one of the clients 504 communicates over a network 1002 (i.e., the Internet, a wireless provider, etc.) to a provisioning server 1004. The provisioning server 1004 is communicatively coupled to an AAA server 1006. In an exemplary embodiment, the provisioning server 1004 may be the central authority 700 and the AAA server 1006 may be the identity providers 704. In another exemplary embodiment, the provisioning server 1004 may be the processing node 110, the enforcement node 602, etc. With respect to provisioning the client 504, in a first exemplary embodiment, the client may be manually configured with the VPN settings. In a larger enterprise deployment, a provisioning portal may be used as in the system 1000.

In an exemplary operation in the system 1000, the client 504 is directed to connect to the provisioning server 1004. After the provisioning server 1004 validates the identity of the client 504 such as through the AAA server 1005, the provisioning server 1004 can dynamically generate a mobile configuration file that is pushed to the client 504. The mobile configuration file could be an Extensible Markup Language (XML) document specifying VPN setting and could also encapsulate credentials such as client certificates, mobile device policies, etc. For example, mobile devices such as Apple iPad and iPhones support tools that allow the creation of granular configuration files that can be distributed to the client 504 using several methods (web, email, etc.). The VPN client can be configured to automatically start a VPN tunnel on-demand, whenever the client 504 tries to access the Internet, for example.

Figure 11:
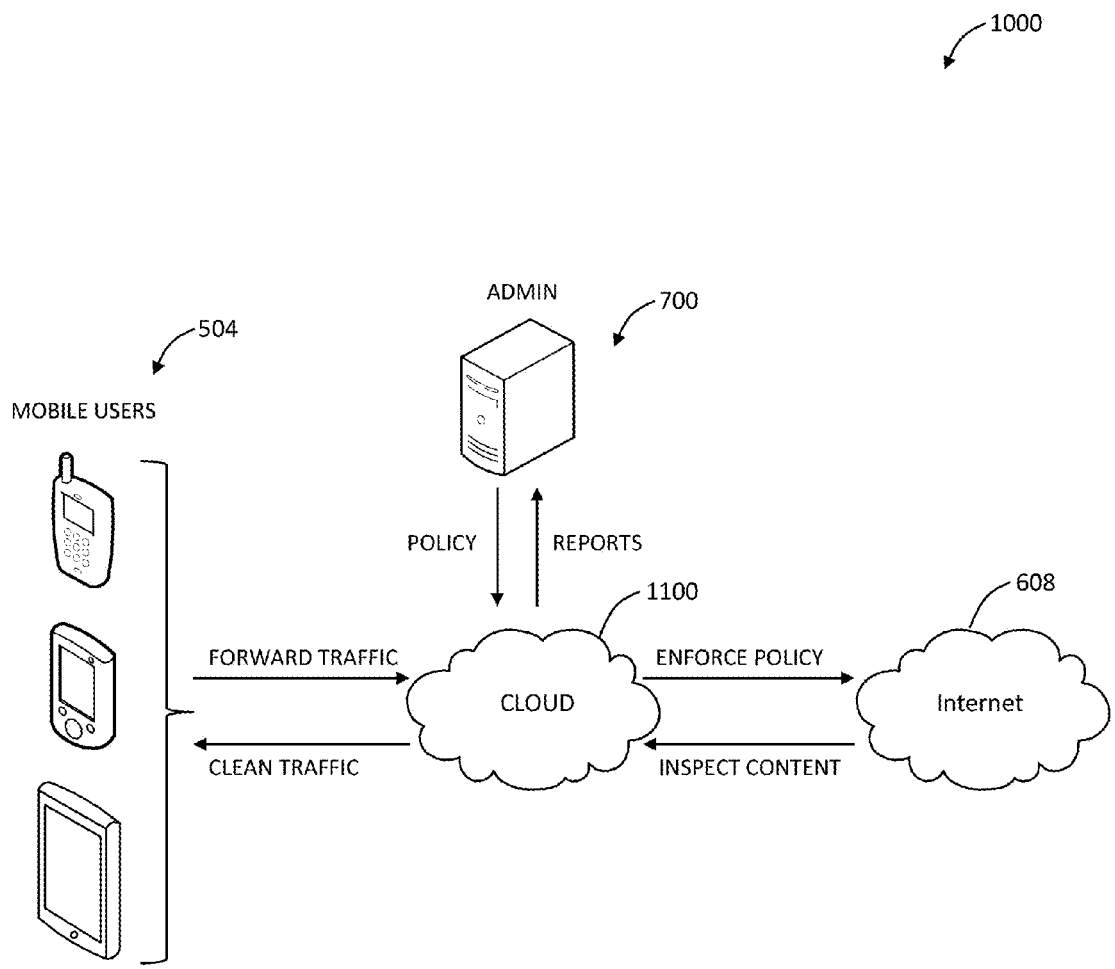
FIG. 11 is a network diagram of an operational process is illustrated for using the client in a distributed, multi-tenant VPN system.

Referring to FIG. 11, in an exemplary embodiment, an operational process is illustrated for using the client 504 in a distributed, multi-tenant VPN system 1000. Traffic from the mobile clients 504 is brought to a cloud 1100 using VPNs. The present invention is described as multi-tenant as it can connect to plural clients 504 across different companies with different policies. The distributed nature of the enforcement nodes 602 minimizes latency. In the present invention, policy in the cloud 1100, not on the client 504. This means all network content is scanned, both browser and application generated web traffic, to ensure that malicious content is blocked in the cloud 1100—long before it reaches the client 504, or the corporate network. The administrator gets a single portal that provides global visibility of user behavior, policy enforcement regardless of user location or device.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A network system, comprising:
    plural mobile devices communicatively coupled to one or more networks; and
    a node communicatively coupled to each of the plural mobile devices via the one or more networks, wherein the node is configured to perform security analysis and policy enforcement on traffic associated with the plural mobile devices;
    a plurality of nodes in addition to the node, wherein the plurality of nodes are communicatively coupled to the one or more networks;
    wherein each of the plural mobile devices is automatically resolved to a nearest of the node and the plurality of nodes based on a Domain Name System address;

wherein each of the plural mobile devices is communicatively coupled to the node via a virtual private network connection that provides all browser and application generated traffic associated with each of the plural mobile devices to be inspected without requiring platform-specific applications on each of the plural mobile devices for inspecting the traffic;

wherein the node is part of a distributed security system in a cloud that is located external from the one or more networks associated with each of the plural mobile devices and one or more enterprise networks thereby providing the security analysis and policy enforcement in the cloud and not on the plural mobile devices; and wherein the distributed security system provides real-time inspection in the cloud for all browser and application generated traffic of each of the plural mobile devices without requiring signature updates on each of the plural mobile devices.

2. The network of claim 1, wherein settings for the virtual private network connection are pushed to one or more of the plural mobile devices.

3. The network of claim 1, wherein the node is configured to bypass some protocols from the plural mobile devices and to inspect and filter other protocols from the mobile devices.

4. The network of claim 3, wherein the node is configured to filter email and web-based traffic to and from the mobile devices.

5. The network of claim 1, further comprising:
at least one of the plurality of nodes configured with a split tunnel between one of the plural mobile devices and an on-premises gateway.

6. The network of claim 1, further comprising:
a central authority communicatively coupled to the node and the plurality of nodes, wherein the central authority is configured to authorize the plural mobile devices and provide network and policy information to the node and the plurality of nodes.

7. The network of claim 6, wherein a central log server is configured to consolidate statistics and logs for each of the plural mobile devices based on data from the node and the plurality of nodes.

8. The network of claim 6, wherein the central authority is communicatively coupled to any of a Lightweight Directory Access Protocol (LDAP) server; Active Directory server; authentication, authorization and accounting (AAA) server, or a Security Assertion Markup Language (SAML) server.

9. The network of claim 1, wherein the plural mobile devices comprises a first set of devices from a first enterprise and a second set of devices from a second enterprise, and wherein the policy enforcement is different between the first enterprise and the second enterprise.

10. A node, comprising:
a network interface communicatively coupled to a network and a least one additional node, wherein the node and the at least one additional node are part of a distributed security system in a cloud;
a data store;
a processor communicatively coupled to the network interface and the data store;

wherein the node is configured to:
establish virtual private network tunnels between plural mobile devices, wherein each virtual private network tunnel for each of the plural mobile devices is configured to provide all browser and application generated traffic associated with a mobile device to be inspected without requiring platform-specific applications on the mobile device for inspecting the traffic;
inspect data from the plural mobile devices to the Internet; and
filter data from the Internet to the plural mobile devices;

wherein the distributed security system is located external from one or more networks associated with each of the plural mobile devices and one or more enterprise networks thereby providing the security analysis and policy enforcement in the cloud and not on the plural mobile devices;

wherein the node is communicatively coupled to a central authority over the network, the central authority configured to provide policy and security information to the node, and the node configured to provide user statistics to the central authority; and wherein the distributed security system provides real-time inspection in the cloud for all browser and application generated traffic of each of the plural mobile devices without requiring signature updates on each of the plural mobile devices.

11. A method, comprising:
obtaining a mobile device;
provisioning the mobile device to communicate on a network via a virtual private network tunnel to an enforcement node that is part of a distributed security system in a cloud;
sending a data request to an external network via the mobile device, wherein the data request is sent via the virtual private network tunnel to the enforcement node, wherein the distributed security system is located externally from the external network and from one or more networks associated with the mobile device, and wherein the data request comprises one of browser and application generated traffic; and
at the enforcement node, enforcing policy on the data request, forwarding the data request to the external network, receiving data responsive to the data request, filtering the data responsive to the data request, and transmitting the data responsive to the data request to the mobile device, wherein the virtual private network tunnel provides all browser and application generated traffic associated with the mobile device to be inspected by the enforcement node without requiring platform-specific applications on the mobile device for inspecting the traffic; and
wherein the distributed security system provides real-time inspection in the cloud for all browser and application generated traffic of the mobile device without requiring signature updates on the mobile device.

12. The method of claim 11, further comprising:
provisioning the mobile device via a push configuration file.

* * * * *